United States Patent [19]

Crowther et al.

[11] Patent Number: 4,937,866

[45] Date of Patent: Jun. 26, 1990

[54] SYSTEM FOR DECODING TRANSMITTED SCRAMBLED SIGNALS

[75] Inventors: Gerald O. Crowther, Sutton; Peter R. Brennand, London, both of England

[73] Assignee: U.S. Philips Corporation, New York, N.Y.

[21] Appl. No.: 79,541

[22] Filed: Jul. 29, 1987

[30] Foreign Application Priority Data

Aug. 13, 1986 [GB] United Kingdom ................. 8619737
Oct. 24, 1986 [GB] United Kingdom ................. 8625487

[51] Int. Cl.$^5$ .............................................. H04L 1/00
[52] U.S. Cl. ...................................................... 380/20
[58] Field of Search ........................................... 380/20

[56] References Cited

U.S. PATENT DOCUMENTS

| | | | |
|---|---|---|---|
| 4,484,217 | 11/1984 | Block et al. ............................ | 380/20 |
| 4,613,901 | 9/1986 | Gilhousen et al. ................... | 358/122 |
| 4,685,131 | 8/1987 | Horne .................................. | 380/20 |
| 4,739,510 | 4/1988 | Jeffers et al. ......................... | 380/15 |
| 4,759,060 | 7/1988 | Hayashi et al. ....................... | 380/10 |

*Primary Examiner*—Thomas H. Tarcza
*Assistant Examiner*—David Cain
*Attorney, Agent, or Firm*—Michael E. Marion

[57] ABSTRACT

In a pay television system, a program signal is transmitted scrambled to prevent its unauthorized reception, the scrambled signal being accompanied by authorization codes, one for each authorized subscriber, a subscription key and a pay-per-view key. At a receiver, if the appropriate authorization code is received, the receiver functions in the subscription mode in which mode the subscription key provides for the descrambling of the program signal. If the appropriate authorization code is not received, indicating that the subscriber is not pre-authorized to receive the program in an intelligible manner, the receiver is set to function in a pay-per-view mode in which mode, on request, the pay-per-view key provides for the descrambling of the program signal. If there is a delay receiving the appropriate authorization code, the receiver can be set into the pay-per-view mode for at least the period of the delay, so that the scrambled signal is immediately rendered intelligible.

14 Claims, 8 Drawing Sheets

Fig.2.

| PH | PT | UCA | UCBMD | U | SDKUP | SAUP | CPUP | CTUP | | |
|---|---|---|---|---|---|---|---|---|---|---|
| 23 | 8 | (36) | (4) | (64) | (64) | (48) | (10) | (12) | (118) | (4) |

Fig.3.

| PH | PT | SCA | VALMD | Spn | 276 × 1 bit. |
|---|---|---|---|---|---|
| 23 | 8 | (24) | (4) | (56) | (276) |

Fig.6.

| PH | PT | SCA | VALMD | Ssc | CA |
|---|---|---|---|---|---|
| 23 | 8 | (24) | (4) | (56) | 276 × 1 bit (276) |

Fig.7.

| PH | PT | CI | LI | PI | LI | PL | PI | LI | Ssc | CW | PCAT | CHID | PNUM | PI | 30 bytes |
|---|---|---|---|---|---|---|---|---|---|---|---|---|---|---|---|
| 23 | 8 | 01 | 56 | 01 | 4 | | 04 | 44 | | | | | | | 240 |
| | | (8) | (8) | (8) | (8) | (16) | (8) | (8) | (56) | (64) | (8) | (16) | (24) | (8) | |

SYSTEM FOR DECODING TRANSMITTED SCRAMBLED SIGNALS

BACKGROUND OF THE INVENTION

This invention relates to a system for enabling a receiver to decode a transmitted scrambled signal which relates to a programme such that said programme may be obtained in an intelligible manner, wherein in addition to the scrambled signal there are additionally transmitted a subscription key and a pay-per-view key, the receiver functioning in a subscription mode in the event that the receiver is pre-authorised to obtain the programme in an intelligible manner with the scrambled signal being decoded under the control of the subscription key in the presence of an authorising code for the receiver whilst in the absence of such pre-authorisation the receiver is set to function in a pay-per-view mode in which case the programme, on request, is obtained in an intelligible manner with the scrambled signal being decoded under the control of the pay-per-view key. The invention also relates to a receiver for use with such a system.

A number of proposals have previously been made for authorising subscribers or subscribers' receivers to receive scrambled signals in an intelligible manner. Proposals for over-air addressing are contained in European Broadcasting Union (EBU) documents SPB 284, "Television Standards for the Broadcasting Satellite Specification of the C-MAC Packet System", 3rd revised edition of December 1984, SPB 352, "Methods of Conveying C-MAC/Packet Signals in Small and Large Community Antenna and Cable Networks Installation", also of December 1984, and Doc. JIWP 10-11/3-1 of March 1986, which documents are incorporated herein by way of reference. These documents refer to a system, known as System B, which is a shared key over-air addressing system where the scrambling process i.e. the process that renders the picture and/or sound/data unintelligible, is derived from a truly random control word (CW1 or CW2). The control word and any programme data (P) are encrypted using a supplementary key (S) and the resulting cryptogram S(P,CW) is sent over-air in an Entitlement Checking Message (ECM). The Supplementary key(s) together with customer messages or authorisations (M) are further encrypted using a shared distribution key (D) and the resulting cryptogram D(M,S) is sent over-air an Entitlement Management Message (EMM). The shared distribution key is stored within the viewer's conditional access sub-system (CASS) which enables this sub-system to derive the Control Word or words, and to store any authorisations. The EMM has two data streams of which the Unique Customer packets are used to update the CASS in terms of shared distribution key, address, etc. and the Shared Customer packets contain the actual entitlements or authorisations.

The above System B proposal is designed to operate at any one time in one mode, either a subscription mode or a pay-per-view mode. The subscription mode is for general or prepaid services where a subscriber is pre-authorised to receive certain or all programmes in an intelligible manner. The pay-per-view mode allows subscribers to select on impulse those programmes they want to receiver the cost for which is deducted from tokens stored in the CASS. As a result of this if a transmission is operating in the subscription mode and a subscriber is not authorised to receive the programme of that transmission as it may not be in a class (tier) of programmes he has not requested there is no way in which he can receive that programme in an intelligible manner.

A system as described in the opening paragraph is disclosed in the PCT International Patent Application of Publication No. WO 83/04154. The system of this publication overcomes the drawback mentioned above in relation to System B in allowing a subscriber to gain access to a programme in the pay-per-view mode if he is not authorised to receive the programme in the normal subscription mode.

SUMMARY OF THE INVENTION

With the systems disclosed above it takes a time for all subscriber authorisations to be transmitted and if a receiver is not left in a stand-by condition it may take quite a time, once a receiver is switched on, for a subscriber to receiver his authorisation. In the intervening period the programme the subscriber has selected will be unintelligible. It is an object of the present invention to overcome this drawback.

The invention provides a system for enabling a receiver to decode a transmitted scrambled signal which relates to a programme such that said programme may be obtained in an intelligible manner, wherein in addition to the scrambled signal there are additionally transmitted a subscription key and a pay-per-view key, the receiver functioning in a subscription mode in the event that the receiver is pre-authorised to obtain the programme in an intelligible manner with the scrambled signal being decoded under the control of the subscription key in the presence of an authorising code for the receiver whilst in the absence of such pre-authorisation the receiver is set to function in a pay-per-view mode in which case the programme, on request, is obtained in an intelligible manner with the scrambled signal being decoded under the control of the pay-per-view key, characterised in that when a delay exists between the selection of a channel carrying the said programme and the receipt of the appropriate authorising code such that in the event that the receiver is to function in the subscription mode the programme would not be received in an intelligible manner for the period of the delay, the receiver can be set to function in the pay-per-view mode during the period of the delay to receive the programme in an intelligible manner whereafter the receiver reverts to function in the subscription mode once the appropriate authorising code has been received.

Such a system has the advantage that it allows the viewer to immediately receive the programme intelligibly as there is no need to wait for the authorising code to be received.

On the selection of a channel carrying the said programme the receiver may be automatically set to function in the pay-per-view mode to provide during an initial period the programme in an intelligible manner, which initial period is at least as long as the said period of the delay. This automatically overcomes the difficulty of the programme being unintelligible until receipt the authorising code appropriate to the receiver at that time.

By or at the end of this initial period the receiver may be set to function in the subscription mode if the receiver is pre-authorised to receive the programme in an intelligible manner but if not so pre-authorised the receiver will continue to function in the pay-per-view mode and only decode the scrambled signal if requested. Thus at the end of this initial period the viewer can have the choice of receiving the programme in an intelligible manner on request or discard the programme if not pre-authorised to receive it.

The subcription key may have a relatively short duration with a given subscription key pertaining to a given programme whilst the pay-per-view key may be of longer duration and pertain to a number of consecutive programmes. In theory the duration of a pay-per-view key could lie between 1 hour and 4 months but would typically be between 2 weeks and 1 month.

The invention also provides a receiver for use with the above system which comprises means for receiving a scrambled signal relating to a programme, means for receiving a subscription key, means for receiving a pay-per-view key, means for receiving authorising codes, means for descrambling said scrambled signal to provide said programme in an intelligible manner, and descrambling control means for controlling the operation of said decrambling means, said receiver functioning in a subscription mode in the event that the descrambling control means receives an authorising code appropriate to the receiver which confirms that the receiver is pre-authorised to obtain the programme in an intelligible manner whereby the scrambled signal is descrambled under the control of said subscription key, whilst in the absence of an authorising code relevant to the said receiver it is set to function in a pay-per-view mode in which case the scrambled signal is descrambled, on request, under the control of the pay-per-view key, characterised in that when a delay exists between the selection of a channel carrying the said programme and the appropriate authorising code being received whereby said programme is not produced in an intelligible manner for the period of said delay, the receiver additionally comprises means for setting the receiver to function in the pay-per-view mode during the delay period whereafter the receiver reverts to function in the subscription mode once the appropriate authorising code has been received.

Means may be provided for automatically setting the receiver to function in the pay-per-view mode on the selection of a channel carrying the said programme to provide during an initial period the programme in an intelligible manner, which initial period is at least as long as the said period of the delay period.

Means may also be provided for setting the receiver to function in the subscription mode at the end of said initial period in the event that the appropriate authorising code is received, said receiver continuing to function in the pay-per-view mode, if required, in the event that the appropriate authorising code is not received.

BRIEF DESCRIPTION OF THE DRAWINGS

The above and other features of the invention will now be described, by way of example, in relation to the accompanying drawings in which:

FIG. 2 shows a primary unique customer entitlement management message packet for use with the present invention, FIG. 3 shows a primary shared customer entitlement management message packet for use with the present invention, FIG. 6 shows a subscription shared customer packet for use with the present invention, FIG. 7 shows a subscription entitlement checking message packet for use with the present invention.

DETAILED DESCRIPTION OF THE INVENTION

The system of the present invention is based on the proposal for the System B access control system the practical implementation for which is described on page 435 etc. of EBU document SPB 284, on page 206 etc. of EBU document SPB 352 and page 221 etc. of EBU Doc. JIWP 10-11/3-1 mentioned above. A detailed description to System B is not given herein and the reader is directed to the above mentioned documents for an understanding of System B. In the following description the references used in relation to packets and blocks of data and their format are assumed to be as disclosed in the above documents and detailed explanations will only be entered into where these differ from the disclosures.

With the System B proposal the Shared Customer Address (SCA) provides either the subscriber validation or authorisation in the subscription mode or loads tokens into the subscriber's controlled access sub-system in the pay-per-view mode. For a given programme it is not possible for different subscribers to gain entitlement to receive that programme in an intelligible manner by the two different modes nor for a subscriber not pre-authorised to receive that programme to gain access to it via the pay-per-view mode. With the present system both possibilities exist.

Figure 1:
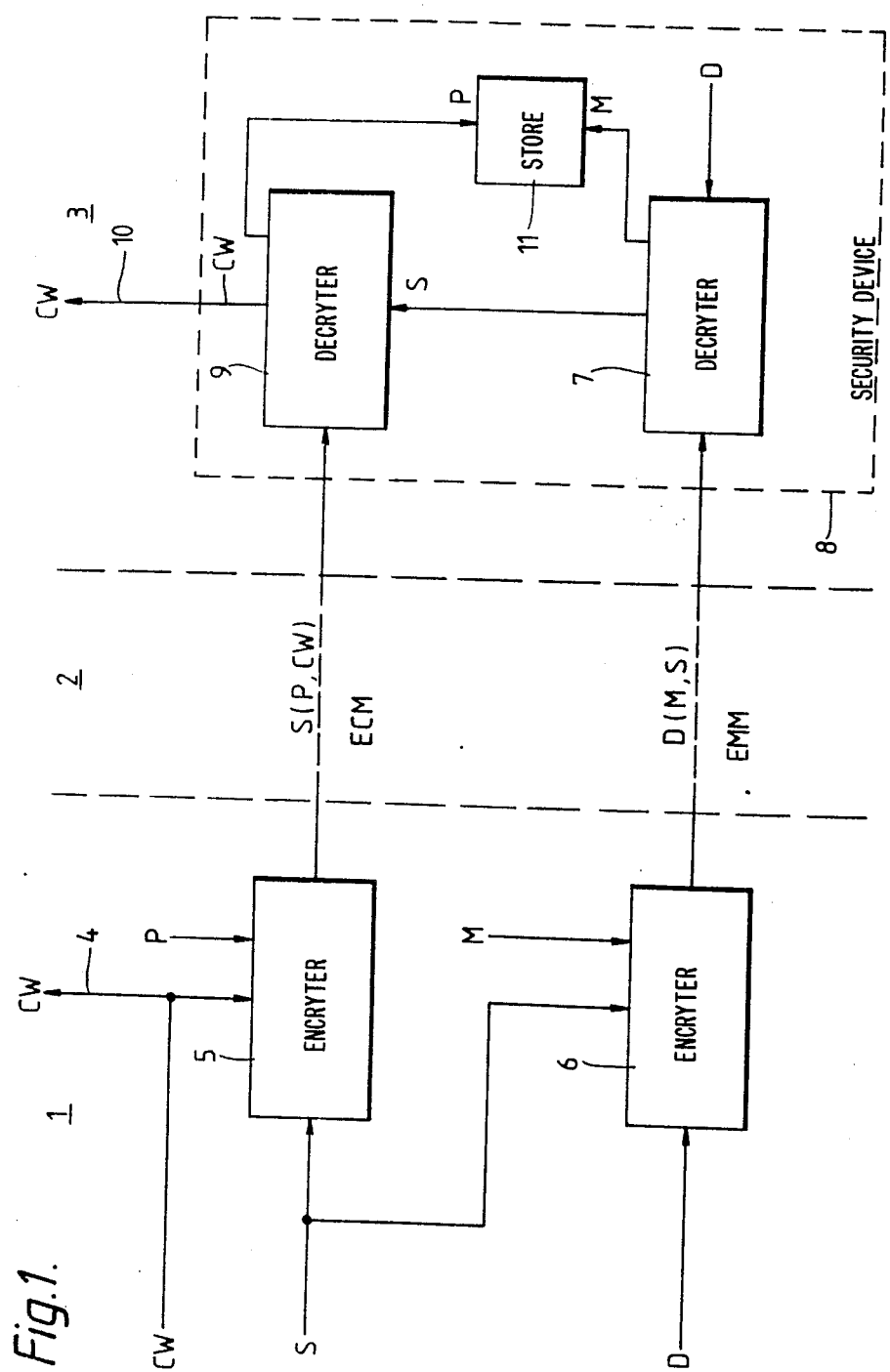
FIG. 1 is an idealised block diagram of a shared key over-air addressing system used with the present invention.

FIG. 1 shows the shared-key over-air addressing system for System B which is based on FIG. 3 of the mentioned parts of the above documents. The figure is divided into three portions where reference 1 denotes the parts contained on the transmission side, reference 2 a transmission path and 3 the parts contained on the receiver side which includes the controlled access sub-system. On the transmission side control words CW (which includes the control words CW1 and CW2) are applied via a connection 4 to a scrambling sequence generator (not shown) to control the scrambling of programme material, both sound and vision. The control word CW is also applied to a first encrypter 5 together with any programme data P and which is encrypted using a supplementary key S to produce at the output of encrypter 5 the cryptogram S(P,CW). The supplementary key S together with customer messages M are applied to a second encrypter 6 and which are encrypted using a shared distribution key D to produce at the output of encrypter 6 the cryptogram D(M,S). In the transmission path 2 the cryptogram S(P, CW) is conveyed in an entitlement checking message (ECM) whilst the cryptogram D(M,S) is conveyed in an entitlement management message (EMM). At the receiver side 3 a first decrypter 7 present in a security device 8 (receives the cryptogram D(M,S) from the EMM together with the shared distribution key D, the decrypter 7 producing the supplementary key S and any customer messages M at separate outputs. A second decrypter 9 receives the cryptogram S(P, CW) from the ECM together with the supplementary key S from decrypter 7 to produce at separate outputs the control word CW and any programme data P. The control word CW (which again includes the control words CW1 and CW2) is applied via a connection 10 to a descrambling sequence generator (not shown) to control the descrambling of the programme material. The customer message M and the programme data P from the respective outputs of decrypters 7 and 9 are applied to a store 11 for example, for charging purposes.

With the present system two overall encryption channels can be defined, these being a Primary Encryption Channel and a Subscription Encryption Channel. The Primary Encryption channel is the data path used by the controlled access sub-system to obtain programmes in the pay-per-view mode and it can also be used during switch-on to gain quick access to a service and hence quickly receive a programme in an intelligible manner. This channel in operation is similar to that of System B in the pay-per-view mode except that in the present system token updates are sent using the Unique Customer Packets. The Primary Encryption channel consists of a number of components in packet form. In the following description of various packets each packet contains a packet header (PH) block of 23 bits and a packet type (PT) block of 8 bits which have been omitted from the descriptions although shown in the corresponding figures. In these figures the plain text messages are assembled least significant bit first, encrypted, and then transmitted least significant bit first. Where a number is shown in brackets this indicates the number of bits used for each function, before encryption and error protection (which is not shown).

The Primary Encryption channel comprises a Primary EMM and Primary ECM's (one for each separately scrambled service). The Primary EMM comprises Unique Customer and Shared Customer packets. The Unique Customer packet is shown in FIG. 2 and comprises:

| | |
|---|---|
| UCA | Unique customer address as System B - (36) bits. |
| UCBMD | Mode as System B - (4) bits. |
| U | Unique Key as System B - (64) bits. |
| SDKUP | Shared distribution key update as System B - (64) bits. |
| SAUP | Shared Address Update as System B - (48) bits. |
| CPUP | Customer word position update. The function definition remains the same as System B. The available customer bits have been reallocated to indicate one of 276 customers - (10) bits. |
| CTUP | Customer token update. The definition is identical to that given in System B under shared customer packet data format - (12) bits. |
| | Unused - (118) bits. |
| | Unallocated - (4) bits. |

The blocks UCBMD upto and including the unused block of (118) bits are encrypted with the Unique Key U.

The Shared Customer Packet is shown in FIG. 3 and comprises:

| | |
|---|---|
| SCA | Shared customer address - (24) bits. |
| VALMD | Mode. If all bits are set to zero the operation is as described in this proposal. Other combinations are reserved for future use - (4) bits. |
| Spn | Next pay-per-view view supplementary key. Its use and operation are identical to that in System B except it is only employed with the primary pay-per-view EMC - (56) bits. |
| | Unallocated - (276) bits. |

The blocks VALMD and Spn together with the unallocated block of (276) bits are encrypted with the Shared Distributed Key D.

Figures 4, 5:
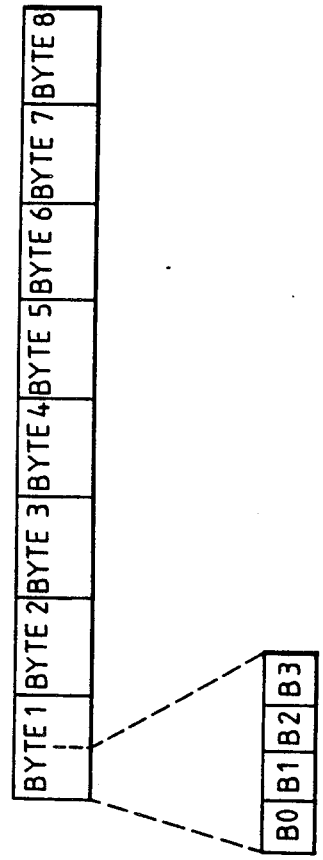
FIG. 4 shows a primary entitlement checking message packet for use with the present invention.
FIG. 5 shows the format of a control word command for use with the present invention.

The construction of each Primary ECM is shown in FIG. 4 and comprises:

| | |
|---|---|
| CI | Command identifier as System B - (8) bits. |
| LI | Length indicator as System B - (8) bits. |
| PI | Parameter identifier whose function is the same as for System B - (8) bits. Code 00 signifies 'pay-per-view' plain text message. |
| LI | Length indicator as System B - (8) bits. |
| SKL | Supplementary key link as System B - (12) bits. |
| PASEMM | Packet Address for the Subscription shared customer EMM. This is sent in plain text and allows the controlled access sub-system to gain access to the Subscription EMM packets. The two most significant bits are set to zero. If the packet address given is all zeroes the programme being transmitted is solely pay-per-view and no subscription EMM packets are being transmitted - (12) bits. |
| PASECM | Packet Address for the Subscription ECM. This again is sent in plain text and allows the controlled access sub-system to gain access to the Subscription ECM packets. The two most significant bits are set to zero. If the packet address given is all zeros the programme being transmitted is solely pay-per-view and no subscription ECM packets are being transmitted - (12) bits. |
| Spn (Spc) | Current pay-per-view supplementary key encrypted by the next pay-per-view supplementary key and has an identical function to Sn(Sc) in System B - (64) bits. |
| PI | Parameter identifier whose function is the same as that in System B - (8) bits. Code 02 signifies pay-per-view per unit time as System B whilst code 03 signifies pay-per-view per programme as System B. |
| LI | Length indicator as System B - (8) bits. |
| Spc | Current primary supplementary key which has an identical function to Sc in System B - (56) bits. |
| CW | Control word (64) bits. This function transports even and odd controls words which can have suffixes from 0 to 7. The even/odd identification signifies the parity of the conditional access frame count thus linking a control word with an 'odd' or 'even' 256 t.v. frame period. FIG. 5 shows the format of the CW commmand with the least significant bit first. In the enlarged section of the first four bits of byte 1 B0, B1 and B2 are the CW identifier whilst B3 is the least significant bit of the controlled access frame count to which the control word corresponds. |
| PCAT | Programme category as System B - (8) bits. |
| CHID | Channel identification as System B - (169) bits. |
| PNUM | Programme number as System B - (24) bits. |
| PI | Parameter identifier - (8) bits. The block replicates that following Spn(Spc). |
| PPVPR | Pay-per-view price - (24) bits. As System B except PI = 02,03, respectively for the two modes of pay-per-view. That is per unit time or per programme. |
| | 5 bytes unallocated - 40 bits. |

The blocks Spc up to and including PPVPR are encrypted with Spc.

As far as subscriber authorisation is concerned a 'central computer' at the transmission end will have continous record of the entitlements of each viewer with respect to the programmes he is allowed to watch. This should be the only place where that data is stored and only that data which tells the receiver that it is (or is not) entitled to receive a particular programme in an intelligible manner should be transmitted over-air. This means that the entitlement authorisations have to be sent out with each programme and that the subscription supplementary key will only have a current value (Ssc) changing with every programme. To transport the subscription entitlements and the current subscription supplementary key (Ssc) a shared customer EMM employing 276 by 1 bit authorisations is used. This EMM can enable (or disable) 20 million or more viewers in less than 3 minutes using an effective data capacity of one NICAM Parity mono sound channel whereas with the System B proposal it would take about 30 minutes to authorise the same number of viewers. The subscription Encryption channel contains a shared customer EMM and the Subscription ECM.

The Subscription shared customer EMM is shown in FIG. 6 and contains

| | |
|---|---|
| SCA | Shared Customer address - (24) bits. Common to 276 subscribers. |
| VALMD | Mode - (4) bits. All bits set to zero represents the operation as described in this proposal. Other values are reserved for future use. |
| Ssc | Current subscription supplementary key - (56) bits. Definition is similar to that in System B except it is employed in conjunction with the Subscription ECM (see below), and is changed at the start of each programme. |
| CA | Customer Authorisations. 276 × 1 bit customer authorisations used to enable a customer and allow the contrblled access sub-system to gain access to the subscription ECM and hence the control words. A binary '1' corresponds to being enabled. |

The blocks VALMD, Ssc and CA are encrypted with the Shared Distribution Key D. This method of customer authorisation is dealt with in greater detail in published European Patent Application No. 0 132 007 A1. As proposed here it allows $20 \times 10^6$ or more viewers to be authorised in less than 3 minutes. The current subscription supplementary key Ssc is changed at the end of each programme to avoid piracy as it could be envisaged that a subscriber could take out a minimum subscription and be validated quite legally and still get access to the Ssc if this were long term. The subscriber could then instruct his receiver to ignore all further subscription shared customer EMM's and although his location (authorisation) bit may be switched to disable the receiver will continue to receive valid programmes until the Ssc is changed. Thus, if for a sequence of programmes a new Ssc is required for each programme and re-validation required for each programme.

The Subscription ECM is shown in FIG. 7 and contains:

| | |
|---|---|
| CI | Command identifier as System B - (8) bits. |
| LI | Length indicator as System B - (8) bits. |
| PI | Parameter identifier whose function is the same as for System B - (8) bits. Code 01 signifies 'subscription' plain text message. |
| LI | Length indicator as System B - (8) bits. |
| PL | Programme Link - (16) bits. This give advanced indication of a change in Ssc, i.e. at the end of programme. The 16 bits correspond to the 16 least significant bits of the controlled access frame count. |
| PI | Parameter identifier whose function is the same as for System B - (8) bits. Code 04 'subscription' cipher text message. |
| LI | Length indicator as System B - (8) bits. |
| Ssc | Current Subscription Supplementary key - (56) bits. Definition is similar to that in System B and is used here as a security check. |
| CW, PCAT, CHID, PNUM, PI | as defined in the Primary ECM (FIG. 4). 30 bytes unallocated - 240 bits. |

The blocks Ssc up to and including PI are encrypted with Ssc.

Whilst by using a system of packets as described above to achieve the ability of receiving a programme either in the subscription or pay-per-view modes, it also offers a high degree of security. The security aspects are based on the following:

i. The security of the system is based on the Unique address, the Unique key and if these are tied to a specific brand and serial number of receiver the security is further enhanced.

ii. Cloning of the system must be one approach of a pirate to avoid payments. However, if the checks set out in (i) above are strictly applied then programme purchase would have to be by a single person and the unit a major item. Cloning is only of advantage in the subscription mode, it does not give free pay-per-view. Further the system allows for a Unique address to be disabled from the system by giving a new shared address to the other 275 valid occupants of that address. The old shared address is no longer transmitted and up-dated with the new keys. No legally purchased systems are disabled.

iii. Another level of attack has to be at the shared address packet and its contents. In particular the next supplementary key Spn. If in some way access could be achieved to this key then it could be envisaged that the pay-per-view mechanism could be by-passed. To reduce the risk of this occurring important keys such as Spn which have to be stored in the control access unit for significant periods could be stored encrypted with the Unit's Unique key. In this way the plain text version of these keys only exist transiently in the control access sub-system central processor unit. Considerable care should be given to the security of the Unique address key.

iv. In the subscription mode the keys are of short duration. However, a possible method of attack is to arrange that all the customer bits are set to enable. It seems extremely unlikely that this could be done on the received signal and would have to be tackled within the controlled access sub-system software.

v. A controlled access sub-system designed to by-pass the above with a Unique address and key from a legitimately purchased unit could be envisaged. Such an item would be more difficult to detect since it would only be necessary to apply for a shared address once. However, if the legitimate industry does not provide an interface for such a unit then the pirate is still faced with the marketing problems identified under (ii) above.

Figure 8:
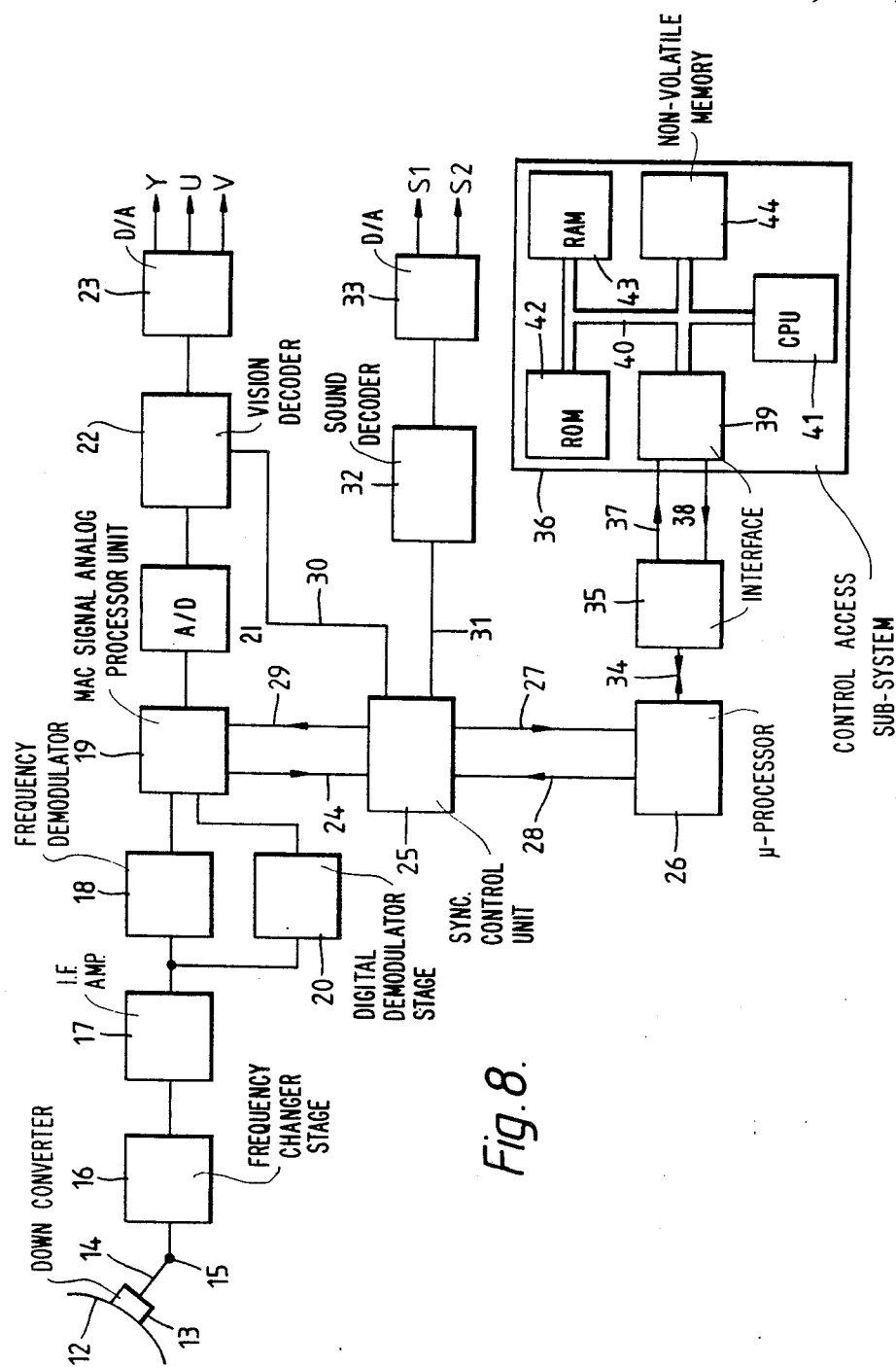
FIG. 8 is a block diagram of a receiver for use with the present invention, and FIGS. 9A, B and C shows a flow chart of a program for controlling the operation of a controlled access sub-system for the receiver of FIG. 8.

A receiver using the present system is shown in FIG. 8 for receiving signals from a C-MAC transmission and where the reference indicates a dish aerial suitable for receiving satellite television signals in the 12 GHz band, the aerial having a down converter 13 attached to it which frequency converts the incoming television signal to a frequency within the 1 to 2 GHz band depending of course on the frequency of the incoming signal. The down converted signal is applied over a co-axial cable 14 to a terminal 15 forming the input for the television receiver, this terminal 15 being connected to an r.f. amplifier and frequency changer stage 16 which amplifies and transforms the incoming signal to a suitable i.f. frequency of about 480 MHz which is further amplified by an i.f. amplifier 17. The output of the amplifier 17 is applied to a frequency demodulator 18 as the vision components of the broadcast satellite television signal are frequency modulated, the demodulated output of the demodulator 18 being applied to an input of a MAC signal analogue processor unit 19 which separates the analogue vision components from the MAC signal. The output of the i.f. amplifier 17 is also applied to a digital demodulator stage 20 where the incoming digital signals which are 2-4 PSK modulated are converted to normal binary form and from which synchronising information and various clock frequencies are derived together with the sound/data and control signals and applied to the analogue processor unit 19. The vision components from the analogue processor unit 19 are applied to an analog to digital converter 21 for conversion to digital form and thence applied to a vision decoder 22 where the luminance and chrominance vision components, subjected to line cut rotation scrambling at the transmission source, are descrambled and re-assembled for application to a digital to analog converter 23 to produce simultaneous analogue Y, U and V components for application to a matrix (not shown) prior to being prepared for display.

The data and clock signals from the digital portion of the MAC signal are applied from the analogue processor unit 19 over a connection 24 to a sync. control unit 25 where various data and synchronising information are processed under the control of a microprocessor 26. Such data are contained in certain areas of the multiplex such as the Service Information (SI) packets and data in line 625 and are applied to the microprocessor 26 over a connection 27. Control data for the sync. control unit 25 is applied from the microprocessor 26 over a connection 28. The sync. control unit 25 applies control data over a connection 29 to the analogue processor unit 19 to control the timing of the digital data to unit 25 and the analogue signals to converter 21 whilst a connection 30 applies control data to the vision decoder 22 to control the descrambling and assembly of the Y, U and V components of the vision signal. The latter control data will include the control word CW2 for application to a descrambling sequence generator controlling the descrambling of the vision components. Data and control signals, including the control word CW1 for application to a descrambling of the sound/data components, are applied over a connection 31 to a sound decoder 32 where the appropriate sound/data services are selected and descrambled, the sound/data signals having been subjected to scrambling at the transmission source by the addition of a pseudo random sequence using an exclusive OR-gate. The appropriate descrambled sound/data services are applied from the sound decoder 32 to a second digital to analog converter 33 to produce (say) two such services S1, S2 for reproduction.

Figure 9A:
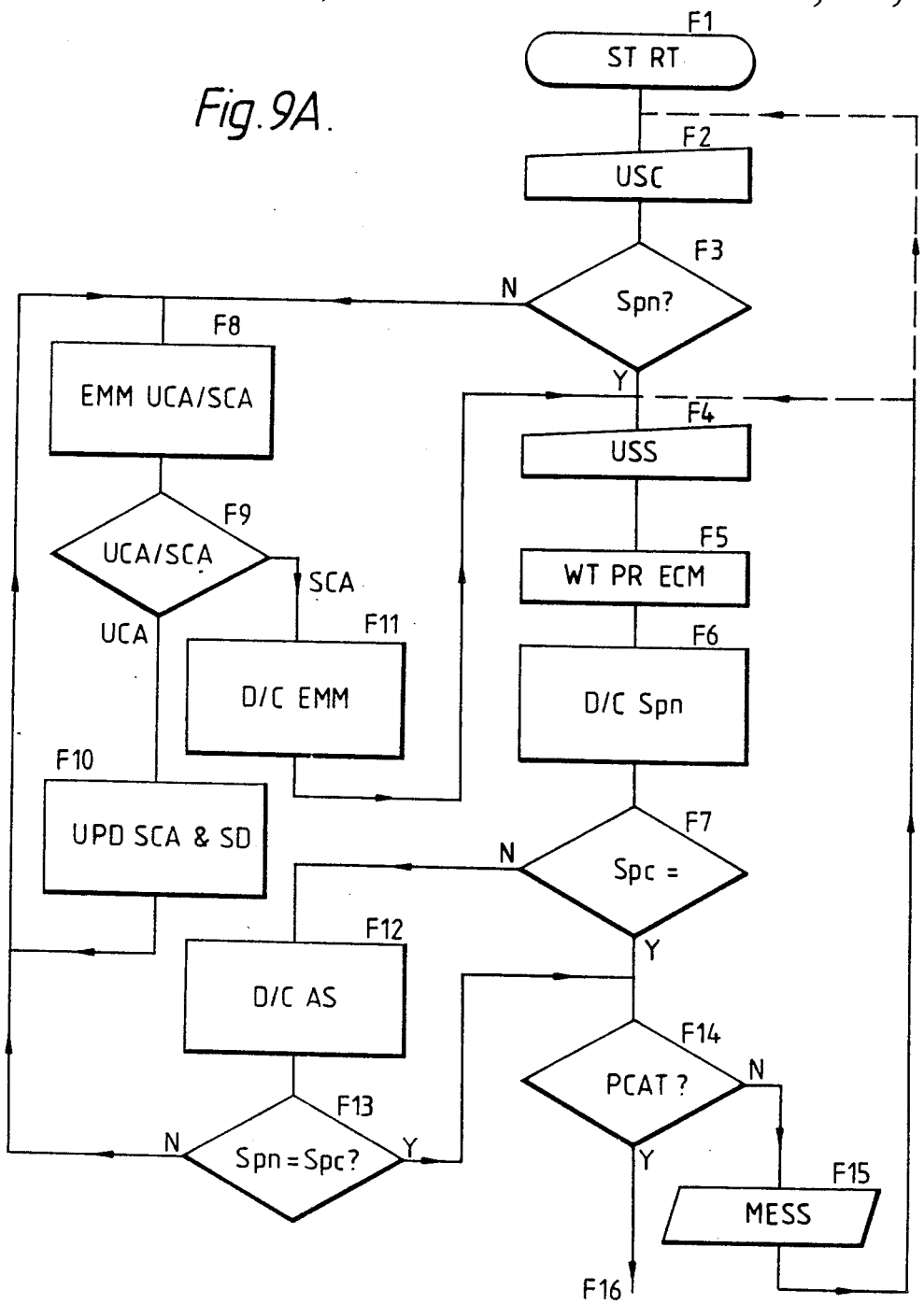
Figure 9B:
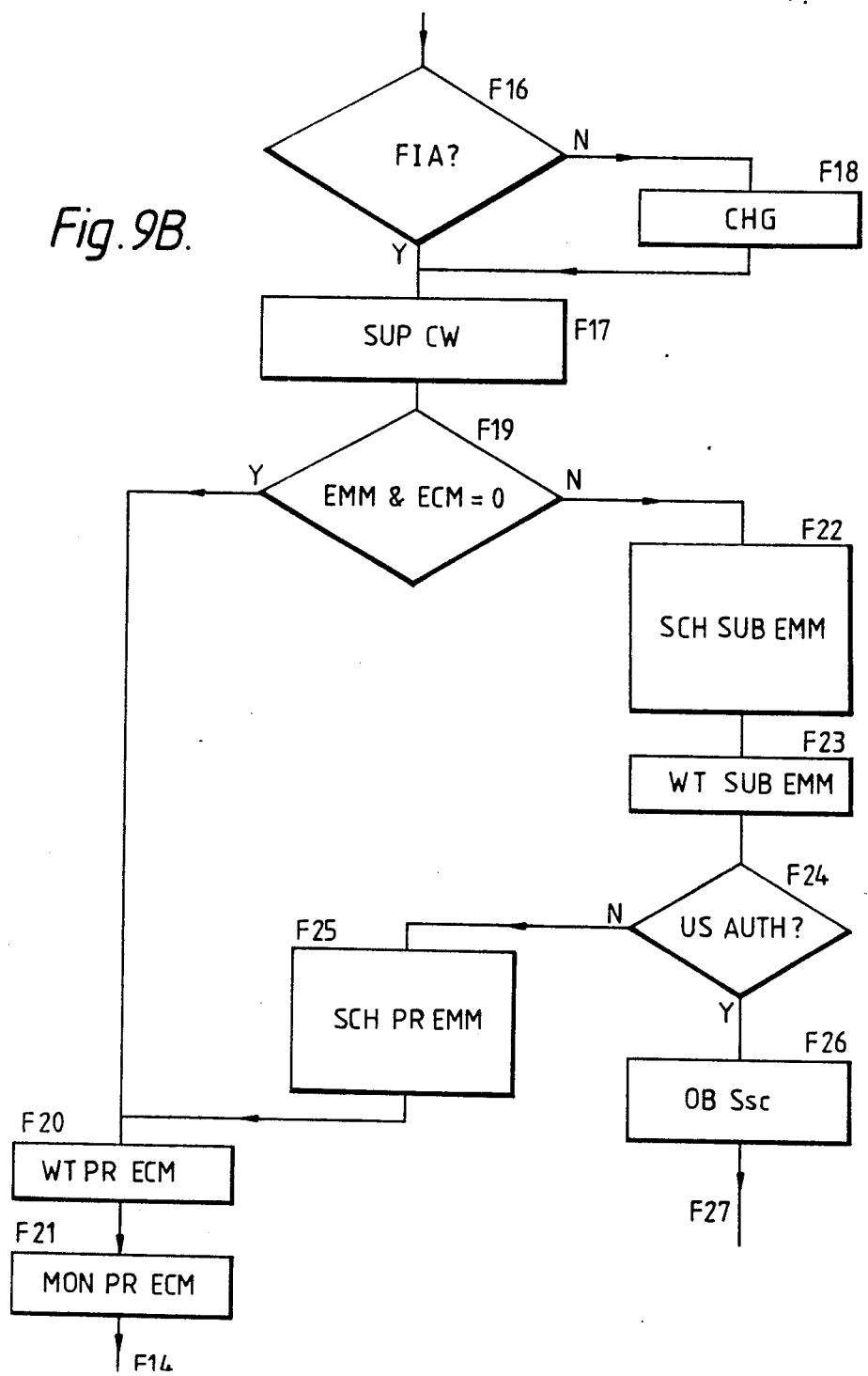
Figure 9C:
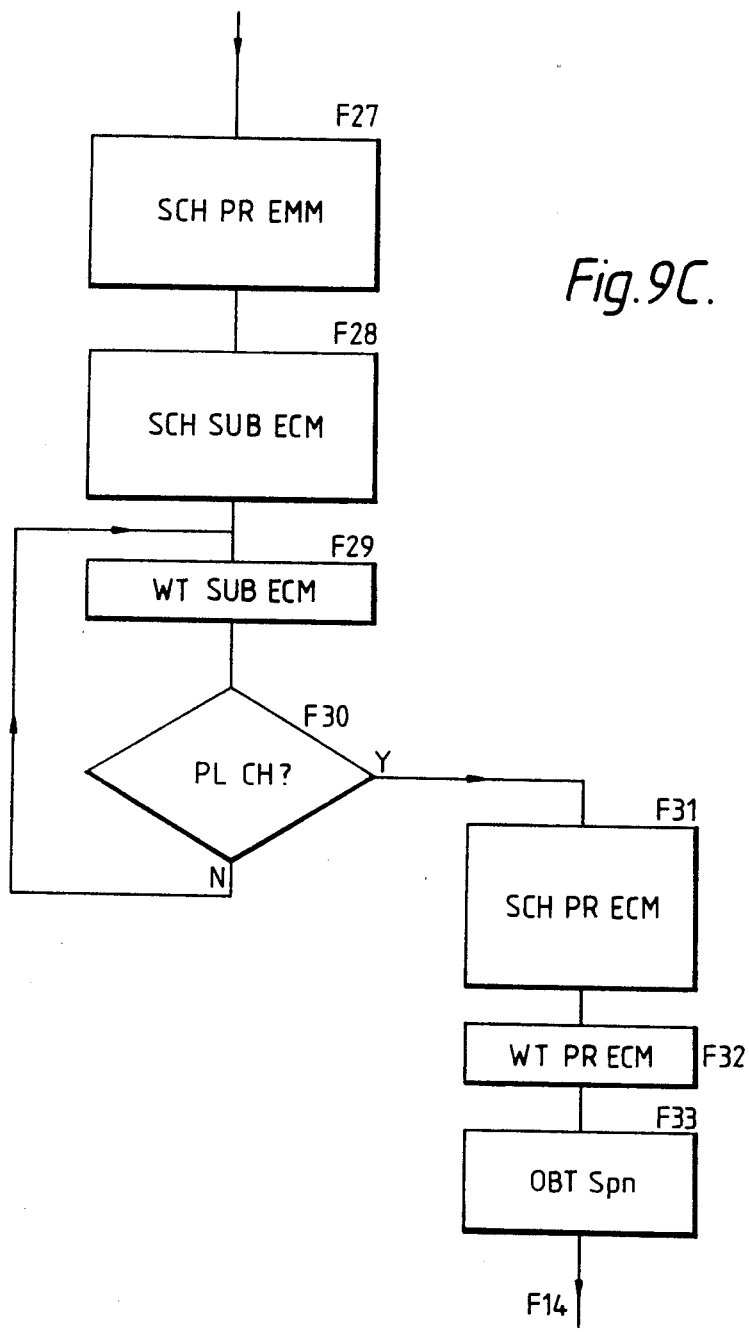

The microprocessor 26 is additionally connected over a two way connection 34 to an interface 35 conveying the data needed for communication with a controlled access sub-system 36 which is connected by input (37) and output (38) connections. The components of the sub-system 36 may be contained within the receiver or may be present on a SMARTCARD or other such similar device as already proposed and connected to the receiver as required. The sub-system 36 contains an interface 39 between the input and output connections 37, 38 and a bus 40. The bus 40 interconnects a central processor unit 41 with a read only-memory (ROM) 42 which provides the program for running the sub-system, a random access memory (RAM) 43 which stores data, and a non-volatile memory (NVM) 44 which provides long time storage for long term keys such as the Unique key and the Supplementary keys. It is the controlled access sub-system 36 in combination with the other parts of the receiver which controls which services may be received in an intelligible manner and the control software of the sub-system 36 is organised to that end. The flow chart of FIGS. 9A, 9B and 9C provides an illustration of such control software.

In the flow chart of FIGS. 9A, 9B and 9C the various boxes and the legends contained therein specify the control software steps as follows:

F1: STRT
This is an instruction to enter the program.

F2: USC
At this point the user selects the channel he wishes to receive.

F3: Spn?
This is an instruction to determine whether a next pay-per-view supplementary key (Spn) value is present in the non-volatile memory 44.

F4: USS
At this point the user selects the service in the channel he wishes to receive. The access related message (ACCM) in packet '0' supplies the decoder with the appropriate ECM packet address.

F5: WT PR ECM
This is an instruction to wait for the primary ECM packet.

F6: D/C Spn
This is an instruction to attempt to decrypt the primary ECM assuming that the stored Spn equals the actual Spn by first deciphering Spn(Spc).

F7: Spc =
This is an instruction to determine whether Spc from Spn(spc) equals Spc from the ciphertext block.

F8: EMM UCA/SCA
This step is entered into when step F3 does not find an Spn value in non-volatile memory 44 and is an instruction to wait for a primary EMM having a packet address given by List X in packet '0', with either a Unique customer address (UCA) or shared customer address (SCA) (if known). This step is also entered into on two other conditions (below).

F9: UCA/SCA?
This is an instruction to determine whether an UCA or an SCA is present.

F10: UPD SCA & Sd
This is an instruction, if an UCA is present at step F9 to update the SCA and the shared distribution key (SD) (and tokens). Once this instruction is completed the program reverts to step F8.

F11: D/C EMM
This step is entered into if an SCA is present at step F9 and is an instruction to decipher the EMM to get the next pay-per-view supplementary key (Spn) and to store it in the NVM 44.

F12: D/C AS
This step is entered into if Spc from Spn(Spc) does not equal Spc from ciphertext block at step F7 and is an instruction to attempt to decrypt assuming that the stored Spn is equal to the actual Spc.

F13: Spn=Spc?
 This is an instruction to determine whether the stored Spn (used for decrypting) equals Spc from the ciphertext block. If these are not equal the program reverts to step F8.

F14: PCAT?
 This is an instruction to determine whether the programme category (PCAT) permits access to this service.

F15: MESS
 This is an instruction to display an explanatory message if PCAT at step F14 does not permit access.

F16: FIA?
 This is an instruction to determine whether the user is entitled to free instant access to the service (user may have done this within the last (say) 15 minutes).

F17: SUP CW
 This is an instruction to the decoder to be supplied with control words CW.

F18: CHG
 This step is entered into if at step F16 the user is not entitled to free instant access and is an instruction to commence charging at the normal pay-per-view rate.

F19: EMM & ECM=0?
 This is an instruction to determine whether the subscription EMM and ECM addresses in the primary ECM packet are both zero.

F20: WT PR ECM
 This step is entered into if step F19 determines that the subscription EMM and ECM addresses in the primary ECM packet are both zero and is an instruction to wait for the primary ECM packet. The status quo has now been achieved with user charged as pay-per-view.

F21: MON PR ECM
 This is an instruction to monitor the primary ECM's for a change in programme number (PNUM) and on a change of PNUM to go to step F14.

F22: SCH SUB EMM
 This step is entered into if step F19 determines that the subscription EMM and ECM addresses in the primary ECM packet are not both zero and is an instruction for the decoder to search for subscription EMM packets with addresses from primary EMM packets.

F23: WT SUB EMM
 This is an instruction to wait for subscription EMM packet.

F24: US AUTH?
 This is an instruction to the decoder to decipher the subscription EMM to determine whether the user is authorised.

F25: SCH PR EMM
 This step is entered into if step F24 determines the user is not authorised and is an instruction to the decoder to search for primary EMM packets again instead of subscription EMM packets. When found goes to step F20.

F26: OBT Ssc
 This step is entered into if step F24 determines that the user is authorised and is an instruction to obtain the current subscription supplementary key Ssc.

F27: SCH PR EMM
 This is an instruction for the decoder to search for primary EMM packets again instead of subscription EMM packets.

F28: SCH SUB ECM
 This is an instruction for the decoder to search for subscription ECM packets rather than primary ECM packets.

F29: WT SUB ECM
 This is an instruction to wait for subscription ECM packet.

F30: PL CH?
 This is an instruction to the decoder to decipher the subscription ECM packet to determine whether the Programme Link (PL) in subscription ECM packets indicates an imminent change of Ssc. If no such change is indicated the program cycles through steps F29 and F30. The status quo has been achieved with the user receiving a service to which he has subscribed, but PL continued to be monitored to anticipate a change of Ssc and hence the end of the programme.

F31: SCH PR ECM
 This step is entered into if step F30 determines that PL does indicate an imminent change of Ssc meaning that the end of the programme is imminent and is an instruction to the decoder to search for primary ECM packets again rather than subscription ECM packets.

F32: WT PR ECM
 This is an instruction to wait for primary ECM packet.

F33: OBT Spc
 This is an instruction to decrypt the primary ECM by first using the stored Spn to obtain Spc from Spn(Spc) and then return to step F14.

The strategy of the above software is to always engage the Primary mode (pay-per-view) before establishing the subscription mode. This ensures that normal viewing will always be obtained with minimal delay, due to the longer term pay-per-view supplementary key (Spc). The cover-time of this key may be 2–3 weeks which means that the controlled access sub-system will usually have the key stored in its memory from a previous viewing session either in its 'next' or 'current' form.

In this way 'free viewing' can be given during a switch on phase whilst the controlled access sub-system searches for the subscription authorisation. This free viewing period works in the following way. Although other methods could be used, it is believed that the one described is adequate to deter most forms of piracy. Each programme has a unique identification given to it by the channel identification (CHID) and programme number (PNUM) sent in the ECM data streams. Thus every programme that has been accessed by the controlled access sub-system can be recorded in its memory (this information could also be used for market research, etc.) To prevent a viewer from obtaining successive free viewing periods, by either turning his 'set' on and off, or changing channel and returning, the controlled access sub-system compares the current identification with those stored over say the last 15 minutes and if any match the controlled access sub-system starts to charge at the pay-per-view rate.

If after the search for subscription authorisation the controlled access sub-system has been enabled by the subscription shared customer EMM, the sub-system then operates in subscription mode mode monitoring the subscription ECMs for changes in programme using the programme link (PL). However, if authorisation is not received the user is offered the possibility of staying in pay-per-view mode charged either on a programme or unit time basis. The switching from one encryption channel to another is achieved by commands send by the controlled access sub-system to the decoder hardware by means of the conditional access interface. The relevant packet addresses are obtained from the SI (though the above EBU documents do not, at present, allow the signalling of EMM channels linked to a particular service), or internally derived from the Primary ECM packets.

In the flow chart the programme category (PCAT) is used as a 'parental key' further restricting programme access on a local basis, e.g. to prevent young children from watching 'adult material'. Unless authorisation is denied, the access process is totally transparent to the user; only in the pay-per-view mode is the user involved in making a decision.

We claim:

1. A system for enabling a receiver to decode a transmitted scrambled signal which relates to a program such that said program may be obtained in an intelligible manner, wherein in addition to the scrambled signal there are additionally transmitted a subscription key and a pay-per-view key, the receiver functioning in a subscription mode in the event that the receiver is pre-authorized to obtain the programme in an intelligible manner with the scrambled signal being decoded under the control of the subscription key in the presence of an authorizing code for the receiver while in the absence of such pre-authorization the receiver is set to function in a pay-per-view mode in which case the program, on request, is obtained in an intelligible manner with the scrambled signal being decoded under the control of the pay-per-view key, characterized in that when a delay exists between the selection of a channel carrying, the said program and the receipt of the appropriate authorizing code such that in the event that the receiver is to function in the subscription mode the program would not be received in an intelligible manner for the period of the delay, the receiver can be set to function in the pay-per-view mode during the period of the delay to receive the program in an intelligible manner whereafter the receiver reverts to function in the subscription mode once the appropriate authorizing code has been received.

2. A system as claimed in claim 1, characterized, in that on the selection of a channel carrying the said program the receiver is automatically set to function in the pay-per-view mode to provide during an initial period the program in an intelligible manner, which initial period is at least as long as the said period of the delay.

3. A system as claimed in claim 2, characterized in that by or at the end of said initial period said receiver is set to function in the subscription mode if the receiver is pre-authorized to receive said program in an intelligible manner but if not so pre-authorised the receiver will continue to function in the pay-per-view mode and only decoder the scrambled signal if requested.

4. A system as claimed in claim 1, characterised in that the subscription key has a relatively short duration with a given subscription key pertaining to a given program while the pay-per-view key is of longer duration and pertains to a number of consecutive programs.

5. A receiver for use with a system as claimed in claim 1, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing-code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled on request, under the control of the pay-per-view key, characterized in that when a delay exists between the selection of a channel carrying the said programme and the appropriate authorizing code being received whereby said programme is not produced in an intelligible manner for the period of said delay, said receiver additionally comprises means for setting the receiver to function in the pay-per-view mode during the period of the delay whereafter the receiver reverts to function in the subscription mode once the appropriate authorising code has been received.

6. A receiver as claimed in claim 5, characterized in that means are provided for automatically setting said receiver to function in the pay-per-view mode on the selection of a channel carrying the said program to provide during an initial period the program in an intelligible manner, which initial period is at least as long as the said period of the delay.

7. A receiver as claimed in claim 6, characterized in that means are provided for setting the receiver to function in the subscription mode at the end of said initial period in the event that the appropriate authorizing code is received, said receiver continuing to function in the pay-per-view mode, if requested, in the event that the appropriate authorizing code is not received.

8. A system as claimed in claim 2, characterized in that the subscription key has a relatively short duration with a given subscription key pertaining to a given program while the pay-per-view key is of longer duration and pertains to a number of consecutive programs.

9. A system as claimed in claim 3, characterized in that the subscription key has a relatively short duration with a given subscription key pertaining to a given program while the pay-per-view key is of longer duration and pertains to a number of consecutive programs.

10. A receiver for use with a system as claimed in claim 2, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled, on request, under the control of the pay-per-view key, characterized in that when a delay exists between the selection of a channel carrying the said program and the appropriate authorizing code being received whereby said program is not produced in an intelligible manner for the period of said delay, said receiver additionally comprises means for setting the receiver to function in the pay-per-view mode during the period of the delay whereafter the receiver reverts to function in the subscription mode once the appropriate authorizing code has been received.

11. A receiver for use with a system as claimed in claim 3, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled, on request, under the control of the pay-per-view key, characterized in that when a delay exists between the selection of a channel carrying the said program and the appropriate authorizing code being received whereby said program is not produced in an intelligible manner for the period of said delay, said receiver additionally comprises means for setting the receiver to function in the pay-per-view mode during the period of the delay whereafter the receiver reverts to function in the subscription mode once the appropriate authorizing code has been received.

12. A receiver for use with a system as claimed in claim 4, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled, on request, under the control of the pay-per-view key, characterized in that when a delay exists between the selection of a channel carrying the said program and the appropriate authorizing code being received whereby said program is not produced in an intelligible manner for the period of said delay, said receiver additionally comprises means for setting the receiver to function in the pay-per-view mode during the period of the delay whereafter the receiver reverts to function in the subscription mode once the appropriate authorizing code has been received.

13. A receiver for use with a system as claimed in claim 8, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled, on request, under the control of the pay-per-view key, characterized in that when a delay exists between the selection of a channel carrying the said program and the appropriate authorizing code being received whereby said program is not produced in an intelligible manner for the period of said delay, said receiver additionally comprises means for setting the receiver to function in the pay-per-view mode during the period of the delay whereafter the receiver reverts to function in the subscription mode once the appropriate authorizing code has been received.

14. A receiver for use with a system as claimed in claim 9, said receiver comprising means for receiving a scrambled signal relating to a program, means for receiving a subscription key, means for receiving a pay-per-view key, means for receiving authorizing codes, means for descrambling said scrambled signal to provide said program in an intelligible manner, and descrambling control means for controlling the operation of said descrambling means, said receiver functioning in a subscription mode in the event that the descrambling control means receives an authorizing code appropriate to the receiver which confirms that the receiver is pre-authorized to obtain the program in an intelligible manner whereby the scrambled signal is descrambled under the control of said subscription key, while in the absence of an authorizing code relevant to the said receiver it is set to function in a pay-per-view mode in which case the scrambled signal is descrambled, on request, under the control of the pay-per-view key, characterized in that when a delay exists between the selection of a channel carrying the said program and the appropriate authorizing code being received whereby said program is not produced in an intelligible manner for the period of said delay, said receiver additionally comprises means for setting the receiver to function in the pay-per-view mode during the period of the delay whereafter the receiver reverts to function in the subscription mode once the appropriate authorizing code has been received.

* * * * *